(12) United States Patent
Nonninger

(10) Patent No.: US 7,582,276 B2
(45) Date of Patent: Sep. 1, 2009

(54) NANOSCALE RUTILE OR ANATASE OXIDE AND METHOD FOR PRODUCING SAME

(75) Inventor: Ralph Nonninger, Saarbruecken (DE)

(73) Assignee: ITN Nanovation AG, Saarbruecken (DE)

( * ) Notice: Subject to any disclaimer, the term of this patent is extended or adjusted under 35 U.S.C. 154(b) by 687 days.

(21) Appl. No.: 10/503,627

(22) PCT Filed: Aug. 30, 2002

(86) PCT No.: PCT/DE02/03188

§ 371 (c)(1),
(2), (4) Date: Jun. 6, 2005

(87) PCT Pub. No.: WO03/068682

PCT Pub. Date: Aug. 21, 2003

(65) Prior Publication Data

US 2005/0233146 A1 Oct. 20, 2005

(30) Foreign Application Priority Data

Feb. 12, 2002 (DE) .............................. 102 05 920

(51) Int. Cl.
| | |
|---|---|
| *B01J 21/06* | (2006.01) |
| *B01J 21/10* | (2006.01) |
| *B01J 23/02* | (2006.01) |
| *B01J 23/06* | (2006.01) |
| *B01J 23/08* | (2006.01) |
| *B01J 23/10* | (2006.01) |
| *B01J 37/03* | (2006.01) |
| *B01J 37/08* | (2006.01) |
| *B82B 1/00* | (2006.01) |
| *B82B 3/00* | (2006.01) |
| *C01F 1/00* | (2006.01) |
| *C01F 5/02* | (2006.01) |
| *C01F 17/00* | (2006.01) |
| *C01G 9/02* | (2006.01) |
| *C01G 15/00* | (2006.01) |
| *C01G 19/02* | (2006.01) |
| *C01G 23/047* | (2006.01) |
| *B01J 23/14* | (2006.01) |

(52) U.S. Cl. ..................... 423/592.1; 423/21.1; 423/69; 423/71; 423/84; 423/87; 423/89; 423/99; 423/111; 423/115; 423/179; 423/263; 423/265; 423/266; 423/275; 423/593.1; 423/594.7; 423/594.9; 423/594.12; 423/594.14; 423/594.15; 423/594.16; 423/598; 423/600; 423/608; 423/610; 423/617; 423/622; 423/624; 423/635; 423/636; 502/304; 502/340; 502/341; 502/342; 502/343; 502/349; 502/350; 502/351; 502/352; 502/353; 502/354; 502/355; 977/773; 977/811; 977/840; 977/895; 977/902

(58) Field of Classification Search ................. 423/71, 423/84, 593.1, 594.9, 594.12, 594.15, 594.16, 423/598, 600, 608, 610, 21.1, 69, 87, 89, 423/99, 111, 115, 155, 179, 263, 265, 266, 423/275, 594.7, 594.14, 617, 622, 624, 635, 423/636; 502/350, 351, 304, 340, 341, 342, 502/343, 349, 352, 353, 354, 355; 977/773, 977/811, 840, 895, 896, 902
See application file for complete search history.

(56) References Cited

U.S. PATENT DOCUMENTS

| | | | |
|---|---|---|---|
| 2,885,366 A | | 5/1959 | Iler |
| 3,437,502 A | | 4/1969 | Werner |
| 4,461,810 A | | 7/1984 | Jacobson |
| 4,643,984 A | * | 2/1987 | Abe et al. ................... 501/134 |
| 4,968,498 A | * | 11/1990 | Wautier et al. ............ 423/593.1 |

(Continued)

FOREIGN PATENT DOCUMENTS

DE  41 05 345  8/1992

(Continued)

OTHER PUBLICATIONS

E. Pelizzetti, C. Minero and M. Vincenti: "Photocatalytic Degradation of Organic Contaminants". Toxic and Hazardous Waste Management 101-138, 1994.

(Continued)

*Primary Examiner*—Timothy C Vanoy
*Assistant Examiner*—Serena L Hanor
(74) *Attorney, Agent, or Firm*—Paul Vincent

(57) ABSTRACT

The invention relates to nanoscale rutile or oxide powder that is obtained by producing amorphous $TiO_2$ by mixing an alcoholic solution with a titanium alcoholate and with an aluminum alcohalate and adding water and acid. The amorphous, aluminum-containing $TiO_2$ is isolated by removing the solvent, and is redispersed in water in the presence of a tin salt. Thermal or hydrothermal post-processing yields rutile or oxide that can be redispersed to primary particle size. The n-rutile or the obtained oxide having a primary particle size ranging between 5 and 20 nm can be incorporated into all organic matrices so that they remain transparent. Photocatalytic activity is suppressed by lattice doping with trivalent ions. If the amorphous precursor is redispersed in alcohol, or not isolated, but immediately crystallized, an anatase is obtained that can be redispersed to primary particle size. A variation of the alcoholates allows production of the following components: $ZrO_2$, $ZnO$, $SnO_2$, ATO, $In_2O_3$, ITO, $Y_2O_3$, BaO, CaO, MgO, $CeO_2$, and BaTiO.

21 Claims, No Drawings

U.S. PATENT DOCUMENTS

| | | | |
|---|---|---|---|
| 5,215,580 | A | 6/1993 | Elfenthal |
| 5,256,728 | A | 10/1993 | Dardaris |
| 5,451,252 | A | 9/1995 | Elfenthal |
| 5,451,390 | A | 9/1995 | Hartmann |
| 5,776,239 | A * | 7/1998 | Bruno ..................... 106/437 |
| 5,840,111 | A | 11/1998 | Wiederhoeft |
| 6,533,966 | B1 * | 3/2003 | Nonninger et al. ....... 252/520.1 |
| 2003/0167878 | A1 * | 9/2003 | Al-Salim et al. ............. 75/711 |

FOREIGN PATENT DOCUMENTS

| | | |
|---|---|---|
| EP | 0 025 583 | 3/1981 |
| EP | 0 059 992 | 9/1982 |
| EP | 0 518 773 | 12/1992 |
| GB | 544283 | 4/1942 |
| GB | 1 435 718 | 5/1976 |
| WO | WO 00 06 495 | 2/2000 |

OTHER PUBLICATIONS

Hisao Hidaka et al.: "Photodegradation of Surfactants. V. Photocatalytic Degradation of Surfactants in the Presence of Semiconductor Particles by Solar Exposure". Journal of Photochemistry and Photobiology, A: Chemistry, 47 (1989) 103-112.

D.N. Furlong, K.S.W. Sing and G.D. Parfitt. "The Precipitation of Silica on Titanium Dioxide Surfaces" Journal of Colloid and Interface Science, vol. 69, No. 3, May 1979.

H.J. Heller: "Protection of Polymers Against Light Irradiation". European Polymer Journal-Supplement, 1969, pp. 105-132.

W.H. Kettler and G. Richter: "Einsatz von ultrafeinem Titandioxid in Metalleffekt-Lackierungen". farbe + lack 98. Jahrgang Feb. 1992.

T.R.N. Kutty, R. Vivekanandan and P. Murugaraj: "Precipitation of Rutile and Anatase ($TiO_2$) fine Powders and Their Conversion to $MTiO_3$ (M=Ba, Sr, Ca) by the Hydrothermal Method". Materials Chemistry and Physics, 19 (1998) 533-546.

G.W. Koebrugge, L. Winnubst and A.J. Burggraaf "Thermal Stability of Nanostructured Titania and Tinania-Ceria Ceramic Powders prepared by the Sol-Gel Process". J. Mater. Chem. 1993, 3(11), 1095-1100.

Bau et al.: "Sol-Gel $TiO_2$". Journal of Inorganic Materials vol. 11, No. 3, Sep. 1996 p. 453 ff.

Zhou Dajun, Cheng Jie, Li Runhua: "Measurement of Light Pulse Width by Two-photon Absorption". Zhangshan Daxue Xuebao; Ziran Kexueban (1996) 35(2) 32ff.

Kyung Suk Oh, Jae Choon Yang, Kyung Taek Jung, Seung Chul Choi and Yong Gun Shul: "Low Temperature Synthesis of Rutile $TiO_2$ in Sol-Gel with Organic Additives". Hwahak Konghak vol. 33, No. 5, Oct. 1995, pp. 544-550.

Lin et al.: Chinese Jouranl of Applied Chemistry vol. 11 No. 5, Oct. 1994 36 ff.

Sang-Hoon Hyun and Heyung-Gu Jung "Preparation and Characteristics of Ceramic Composite Powders Coated with $Al_2O_3$: (II) Composite Powders of $Al_2O_3$-$TiO_2$". Joural of the Korean Ceramic Society vol. 28, No. 4, pp. 338-346, 1991.

H. Cheng, J. Ma, Z. Zhao, L. Qi: "hydrothermal Preparation of Uniform Nanosize Rutile and Anantase Particles" Chem. Mater, vol. 7, Nr. 4, 1995, pp. 663-671, XP002228894 mentioned in the specification p. 668, col. 2, Par. Mineralizer—p. 670, col. 1, Par. DTA p. 671, Par. Conclusions.

S. -H. Lee et al.: "Synthesis of Ti02 photocatalyst thin film by solvothermal method with a small amount of water and its photocatalytic performance" J. Phochem. and Photobiol. A: Chemistry, vol. 146, 2001, pp. 121-128, XP002228895 entire document.

Römpp Chemile: Lexikon, Prof. Dr. Juergen Falbe, Düsseldorf and Prof. Dr. Manfred Regitz, Kaiserslautern Georg Thieme Verlag Stuttgart—New York.

A. Chemseddine, Th. Moritz: Eur. J. Inorg. Chem., 1999, pp. 235-245, XP002228896 p. 244, par. Experimental p. 236, par. Results.

* cited by examiner

NANOSCALE RUTILE OR ANATASE OXIDE AND METHOD FOR PRODUCING SAME

This application is the national stage of PCT/DE02/03188 filed on Aug. 30, 2002 and claims Paris Convention priority of DE 102 05 920.9 filed Feb. 12, 2002.

BACKGROUND OF THE INVENTION

The invention concerns a method for producing a nanoscale rutile or a nanoscale oxide with a primary particle size of less than 40 nm, which redisperses to primary particle size in all conventional solvents, preferably water and alcohols. The method is also suited to produce other nanoscale oxides such as anatases, $ZrO_2$, ZnO, $SnO_2$, ATO ($SnO_2$ doped with Sb), $In_2O_3$, BaO, CaO, MgO, $CeO_2$ and $BaTiO_3$.

In nature, titanium dioxide exists in three crystal modifications: rutile, brookite and anatase, wherein brookite has the least technical importance. The anatase and rutile modifications can absorb UV light due to their electronic structure, wherein the absorption edge for anatase is at 3.23 eV and for rutile at 3.05 eV. With this absorption, reactive electrons/hole pairs are formed in the $TiO_2$ particle which migrate to the surface of the $TiO_2$ particle where they are available for chemical reactions, whether this is desired or not. This property known as photocatalytic activity is more pronounced in anatase than in rutile.

The high photocatalytic activity of anatase can be utilized e.g. for cleaning sewage. Nanoscale anatase conventionally removes heavy metal ions from aqueous solutions by reduction. The heavy metal reduced through the catalysis precipitates at the surface of the anatase. The reducing agents are organic impurities which are also destroyed in this process [Photocatalytic Purification and Treatment of Water and Air, Editors Ollis D. F. and Al-Ekabi H., 253ff (1993)]. The photocatalytic oxidation of organic impurities in water using anatase has been frequently described [Pelizzeti E. et. Al., Euro Courses: Environ. Menage., 2 101ff (194) and Hidaka H. et. Al., Journal of Photochemistry and Photobiology, A: Chemistry, 47 103ff (1989)].

Rutile is somewhat less photocatalytically active. The recombination of the reactive electrons/hole pairs is larger than its reducing effect. To completely suppress the remaining photocatalytic activity, rutile (sub-µm rutile is usually used) is lattice-doped with an inorganic coating of $Al_2O_3$, $SiO_2$ and $ZrO_2$ and/or with trivalent ions such as $Al^{3+}$, $Fe^{3+}$, $V^{3+}$, $Ru^{3+}$, $Os^{3+}$, or $Rh^{3+}$. The coating effects spatial separation of the matrix surrounding the rutile from the reactive intermediates (electron/hole pairs) [Furlong D. N. et. Al., J. of Colloid and Interace science, 69 (3), 409ff (1979)]. The lattice doping provides recombination possibilities for the generated charge carriers. Only this measure permits use of rutile e.g. as white pigment in paints or as UV protection in polymers. The rutile usually has a primary particle size of not less than 200 nm.

In comparison with organic UV absorbers, rutile has the advantage that it is not destroyed by the UV radiation and cannot be extracted from a matrix (e.g. a polymer). [Heller H., European Polymer Journal-Supplement, Pergamon Press. England, 105ff (1969) and Valet A., Farbe und Lack 96, 185ff (3/1990)]. Only the size of the coated n-rutile is disadvantageous, since a sub-µm rutile refracts the light, thereby precluding transparent applications.

In view of the above, a nanoscale rutile of particle sizes of less than 40 nm would provide completely new perspectives, since particle sizes which are considerably smaller than the wavelength of the visible light permit combination of effective UV absorption with transparency. Transparent polymers or transparent sun blockers with one inorganic UV absorber would thereby be possible. The reduction of the particle size results in an increase in the specific powder surface and photocatalytic activity, such that the nanoscale rutile should either be lattice-doped and/or be provided with an inorganic coating.

The production of nanoscale rutile is described in prior art using aqueous and alcoholic solutions. Hydro-thermal post-crystallization is also known.

Pigmentary sub-Mm $TiO_2$ is a useful white pigment which is technically obtained on a large scale from Ilmenite $FeTiO_3$ in accordance with the "sulfate" and the "chloride method" [Hollemann Wiberg, ISBN 3-11-007511-3, (1985)]. Both methods use water as a solvent. The resulting rutile particles have the shape of a needle and an average primary particle size of 110 nm. The production of ultrafine rutile is also described in Kutty et al. with the same result [Materials Chemistry and Physics, 19, 533ff (1988)] and in Cheng et al. [Chem. Mater. 7 663ff (1995)].

Since the particle size of the rutile is excessively large for the above-described applications, Cheng et al. [Chem. Mater. 7 663ff (1995)] and Elfenthal et al. [DE 4105345A (1991)] have tried to reduce the particle size before precipitation of the fine rutile through addition of mineralizers such as $SnCl_4$, $NH_4Cl$ or NaCl. This actually reduces the primary particle size of rutile, but not the particle size of rutile which forms during redispersion of rutile in the solvent, since the products produced are highly aggregated. The primary particle size of the n-rutile is e.g. reduced to 35 nm, through the addition of 4 weight % of $SnO_2$ and to 15 nm through the addition of 10 weight % of $SnO_2$ [DE4105345A (1991)]. Attempts to redisperse these rutile particles always produce milky products having a particle size distribution which corresponds to that of the larger pin-shaped rutile. Elfenthal et al. [DE4105345A (1991)] describe the difficulty of transparent redispersion of the subpigmentary titanium dioxide, and have produced rutile having a particle size of between 20 and 100 nm and incorporated it into polyethylene. In accordance with Elfenthal et al. there is incomplete transparency in the visible spectral range, even with the finest products. This means that that the particle size is always much larger than 40 nm.

The literature widely describes the production of nanoscale $TiO_2$ via the sol-gel method or via non-aqueous synthesis methods. However, only amorphous $TiO_2$ or anatases are produced in this way. To synthesize rutile in this fashion, the obtained products must be thermally or hydro-thermally post-treated at temperatures of usually between 550 and 800° C. This thermal treatment causes the particles to grow and inter-grow among each other which means that synthesizing of a product which can be redispersed below 100 nm is not possible. Koebrugge et al. produced an amorphous $TiO_2$ [J. Mater. Chem., 3 (11), 1095ff (1993)] which converts into rutile only above 800° C. and with a dwell time of 8 hours. The primary particle size thereby increases from 7.7 nm (200° C.) to 13.2 nm (450° C.) and to 89 nm (800° C.). During temperature treatment, the nanoscale particles grow into aggregates of a size from sub-µm to µm. Bao et al. [Wuji Cailiao Xuebao, (1996), 11 (3), 453ff], Zhou et al. [Hwahak Konghak, 33 (5), (1995) 544ff] have made similar experiences. Liu et al. [Yingyong H. (1994), 11 (5), 36ff] were able to reduce the conversion temperature to 400° C. through the addition of diethyl ether, but the quality of the rutile was not changed.

In summary, rutile needles (of a length between 70 and 100 nm) which have good redispersion properties and doped rutile particles which are difficult to redisperse can be generated using aqueous synthesis methods. Neither of these cases produces a product which can be transparently worked into an organic matrix, since particles having sizes in excess of 70 nm refract light. There are several hundred literature citations concerning the sol/gel and non-aqueous synthesis methods which produce either amorphous $TiO_2$ or anatase. In contrast to the aqueous method, rutile is not produced directly thereby. Many of these attempts merely report that rutile is formed during thermal post-treatment usually at more than 550° C. These products cannot be redispersed to primary particle size in consequence of these high temperatures.

Since redispersion of the nanocrystalline titanium dioxide to a particle size of <40 nm, as described above, is required to transparently redisperse the titanium dioxide as a UV absorber in organic polymers, in particular plastic materials, glazes, cosmetic products or paints, none of the nanoscale titanium dioxide powders mentioned in literature are suited in the present case.

The finest rutile available today is currently used in sun blockers to increase the UV factor [EP0518773, 1992]. It is usually pin-shaped, has a length of at least 70 nm and a width of up to 10 nm. The fact that the manufacturers of n-rutile, e.g. Sachtleben, discuss a particle size for primary crystals in the region of 10-15 nm does not change this, since they themselves say that these primary crystals accumulate in the products into pin-shape objects, i.e. form aggregates, thereby attaining lengths of 100 nm. Manufacturers of coated rutile still face the problem that there is no conventional method to uniformly coat defined, individual particles having a size of considerably less than 100 nm. Coating usually produces agglomeration of the particles, and the generated agglomerates (which look like "grapes") are coated thereby producing "growth towards each other". The size of the rutile and the associated refraction of light produce a white color when the cream is applied to the skin, which is, of course, less the thinner the layer. An absolutely colorless cream would obviously be more acceptable, but rutile which can be distributed to a particle size of <40 nm is presently not available, as has been described in detail above. The scattering losses absolutely preclude use of the known rutile in transparent polymers. A new field of application for fine-particle titanium oxides has only been obtained in the area of decorative automotive painting. Combined with current aluminum pigments, one obtains an interesting iridescent effect in two-layer metal decorative painting. The visual impression changes in dependence on the angle of observation [Farbe und Lacke 98, 93ff (2/1992)].

To be able to use n-rutile as UV absorber in paints, polymers, creams etc. its catalytic activity must be minimized either through precise doping or through application of inorganic layers of $Al_2O_3$, $SiO_2$ and $ZrO_2$. These layers are usually applied through dispersion of $TiO_2$ in water and precipitation of a hydroxide of aluminum, zirconium and silicon via a pH value change. Iller is based on sodium silicate [U.S. Pat. No. 2,885,366, 1959], Werner A. H J. on sodium silicate and sodium aluminate [U.S. Pat. No. 3,437,502, 1969], Jacobson H. W. et al. on sodium aluminate [U.S. Pat. No. 4,461,810], Luginsland H. H. et al. on zirconyl chloride and zirconyl sulfate [DE 2223524, 1972], Sayer et al. [EP 059992, 1993] on zinc chloride and Hyun S. H. et al. on aluminum sulfate and aluminum nitrate [J. of Korean Ceram. Soc. 28(4), 338ff (1991)]. A variant is described by Dardaris et al. [U.S. Pat. No. 5,256,728, 1993] who coat $TiO_2$ with polysiloxanes. This US patent describes the production of pigmented polycarbonate. Another possibility to reduce the catalytic activity of $TiO_2$ is to dope the titanium dioxide lattice with trivalent or pentavalent elements which can intercept the generated reactive intermediate stages. Doping with Fe, Sb, Al, In, Ce, Nb and V is thereby possible [DE 4222905, 1992].

Inorganic coating of nanoscale rutile having a particle size of less than 40 nm is very difficult since the conventional pH value change of the suspension during the coating method produces agglomeration of the particles such that the produced agglomerates are coated rather than the primary particles. Prior art provides no solution.

SUMMARY OF THE INVENTION

It is therefore the object of the present invention to provide a rutile or an oxide having a primary particle size of ≦40 nm which can be redispersed to primary particle size.

Another object of the invention is to provide a method for producing rutiles or oxides of ≦40 nm which can be redispersed to a particle size of ≦40 nm.

The inventive method permits production of a nanoscale doped rutile with a primary particle size of 10 nm which can be redispersed to this particle size in water and all conventional solvents. With a particle size distribution of $d_{90}$=30 nm, this n-rutile no longer refracts the light and can be transparently worked into all organic matrices. This improvement is of decisive technical importance, since it provides a considerably wider field of application for nanoscale rutile, such as e.g. the production of a transparent UV protected plastic material e.g. as replacement for glass, wherein the UV protection does not decrease with time (organic UV absorbers are also damaged by UV radiation) and is not washed out (organic UV absorbers tend to migrate). Simultaneous lattice doping with trivalent ions largely suppresses the photocatalytic activity. Application of an inorganic coating onto the individual, defined nanoparticles is also possible without agglomeration of the particles.

DESCRIPTION OF THE PREFERRED EMBODIMENT

It is also the object of the invention to provide a method for producing nanoscale, doped and optionally coated rutile powders, wherein an amorphous $TiO_2$ is initially produced through the addition of titanium alcoholate and aluminum alcoholate to an alcoholic solution, preferably isopropanol or n-propanol, thereby adding water and acid. The produced amorphous $TiO_2$ is isolated through removal of the solvent, and is characterized by a particle size of between 2 and 10 nm, preferably between 3 and 6 nm, and a specific surface of more than 50 $m^2/g$, preferably more than 100 $m^2/g$ and, particularly preferred, in excess of 150 $m^2/g$. A solution of the amorphous $TiO_2$ produced in this manner is transparent and has a particle size distribution of $d_{90}$<20 nm, preferably $d_{90}$<10 nm.

To produce the doped nanoscale rutile, the freshly produced amorphous $TiO_2$ is redispersed in an aqueous solution which was adjusted to an acidic pH value using an acid. The change of the solvent from alcohol to water is a very important method step since crystallization without solvent exchange with otherwise analogous conditions would only obtain anatase. The obtained suspension is homogenized after addition of a tin salt (or alternatively $NH_4Cl$ or NaCl) and crystallized in an autoclave at a temperature between 100 and 300° C., preferably between 200 and 250° C. The crystallization time is thereby at least one hour, preferably 6 hours. Crystallization may also occur with heat only, at temperatures between 50 and 150° C., preferably at 100° C. The dwell time is more than an hour, preferably between 4 and 8 hours.

The rutile produced in this manner has a crystallite size of between 5 and 20 nm, preferably between 5 and 10 nm and a specific surface of between 30 and 250 m²/g, preferably between 50 and 150 m²/g. A solution of this rutile in water is transparent, i.e. all particles in the suspension are smaller than 40 nm (particle size measurement was carried out with all currently known methods). The crystallization of a rutile ≦40 nm from a solution, based on an alcoholic solution of an alcoholate is thereby possible for the first time.

The content of aluminum in the crystal lattice is between 0.1 and 0.5 mol %, preferably between 0.2 and 0.4 mol %. This lattice doping almost completely suppresses the catalytic activity of nanoscale rutile, which shows e.g. in that the lattice-doped nanoscale rutile no longer decomposes organic colorants such as e.g. murexide and UV radiation.

Large amounts of added aluminum precipitate on the powder surface in the form of aluminum hydroxide/oxide. The forming layer permits growth of further aluminum hydroxide/oxide by redispersion of the synthesized $TiO_2$ powder in a thinned aluminum salt solution and subjecting it to hydrothermal post-treatment. The above-described enrichment of the aluminum hydroxide on the $TiO_2$ surface is associated with a shift of the isoelectrical point by two pH units.

If the aluminum salt solution is replaced by a silicon or zirconium salt solution, a thin silicon or zirconium film can be provided around the particles in the same manner. Due to the almost constant pH value, there is no uncontrolled precipitation of aluminum, silicon or zirconium oxide.

The tin content in the crystal lattice may be between 4.0 and 13 mol %. With increasing tin content, the primary particle size of the nanoscale rutile is reduced from 15 to 4 nm and the specific powder surface is increased from 80 to 200 m²/g.

Moreover, the redispersibility of the nanoparticles improves with increasing tin content. The absorption edge of the synthesized n-rutile is between 390 and 410 nm, preferably between 395 and 405 nm, depending on the aluminum content. A minimum amount of tin in the crystal lattice is required to form the rutile which is above 2 mol %, preferably above 3 mol % and, particularly preferred above 4 mol %.

Compounds which are suited to produce the amorphous rutile precursor, are preferably aluminum and titanium alcoholates which can be obtained e.g. from the company Gelest Inc.; Tullytown, Pa., USA, preferably, however titanium isopropoxyde, titanium-n-propoxyde, titanium isobutoxyde, titanium-n-butoxyde, titanium ethyoxyde, titanium methoxy propoxyde and titanium methoxyde or aluminum secondary butylate ($Al(O^sBu)_3$), aluminum tertiary butoxyde, aluminum-n-butoxyde and aluminum isopropoxyde.

In principle, any acid can be used to adjust the acidic pH value, but inorganic acids are preferable, with particular preference for hydrochloric acid.

In principle, any water-soluble tin compound is suited for tin doping of the rutile in order to stabilize its crystal structure. However, tin salts, such as tin chloride, tin sulfate and tin oxalate, are preferred.

In a modification of the method described herein, the amorphous $TiO_2$ which is produced by adding aluminum alcoholate to an alcoholic solution of a titanium compound thereby adding water and hydrochloric acid, is not isolated, rather the alcoholic solution is directly hydrothermally or thermally crystallized. The hydrothermal crystallization is preferably carried out in an autoclave at a temperature between 100 and 300° C., preferably between 200 and 250° C. The crystallization time is thereby at least one hour, preferably 6 hours. The crystallization can also be carried out in a purely thermal manner at temperatures between 50 and 150° C., preferably at 100° C. The dwell time is more than an hour, preferably between 4 and 8 hours. In this manner, a nanoscale anatase can be produced having a crystallite size of between 3 and 25 nm, preferably between 5 and 10 nm and with a specific surface area of between 100 and 250 m²/g, preferably between 140 and 200 m²/g. The absorption edge of the n-anatase is between 370 and 380 nm. A solution of anatase in water is transparent at a particle size distribution of $d_{90}(vol)<20$ nm.

This method for synthesizing nanoscale anatase can also be used for synthesis of nanoscale zirconium oxide. Towards this end, the amorphous $ZrO_2$ which is obtained through optionally adding one yttrium alcoholate to an alcoholic solution of a zirconium compound, thereby adding water and hydrochloric acid, is directly hydrothermally or thermally crystallized in the alcohol solution. The hydrothermal crystallization is preferably carried out in an autoclave at a temperature between 100 and 300° C., preferably between 200 and 250° C. The crystallization time is thereby at least one hour, preferably 6 hours. Crystallization may be achieved using heat only at temperatures between 50 and 150° C., preferably at 100° C. The dwell time is more than an hour, preferably between 4 and 8 hours. Nanoscale zirconium oxide can be produced in this manner and is obtained in a stabilized form in the presence of yttrium alcoholate with a primary particle size of between 5 and 10 nm and a specific powder surface area between 150 and 300 m²/g, preferably between 180 and 220 m²/g. Zirconium ethyoxyde, zirconium isopropoxyde, zirconium-n-propoxyde, zirconium-n-butoxyde and zirconium-2methyl-2butoxyde are preferably suited as the zirconium alcoholate. Yttrium isopropoxyde, yttrium methoxyde and yttrium methoxyethoxyde are preferably used as yttrium alcoholate.

Analogous to the above synthesis of zirconium oxide (optionally with and without doping component yttrium), further nanoscale material systems such as $SnO_2$, ATO, $In_2O_3$, ITO, $Y_2O_3$, $CeO_2$, $BaTiO_3$, ZnO, BaO, CaO and MgO can be synthesized through variation of the alcoholates used. The matrix can be changed through replacement of the zirconium alcoholate in the above-mentioned description by an alcoholate of another element. The doping substance can be changed through replacement of the yttrium alcoholate in the above description by an alcoholate of another element. The alcoholates required for the matrix material and for the doping material can be obtained e.g. from the company Gelest Inc, Tullytown, Pa., USA.

Tin ethoxyde, tin isopropoxyde and tin methoxyde are preferably suited for synthesis of $SnO_2$ and ATO. The antimony doping of $SnO_2$ for the production of nanoscale ATO is preferably carried out with antimony methoxyde, antimony ethoxyde, and antimony-n-butoxyde. Indium methoxy ethoxyde is particularly suited for synthesis of $In_2O_3$ and ITO. Tin doping of $In_2O_3$ with Sn to produce ITO is preferably carried out with tin ethoxyde, tin isopropoxyde and tin methoxyde. Yttrium isopropoxyde, yttrium methoxyde and yttrium methoxy ethoxyde are preferably suited for synthesis of $Y_2O_3$. The preferred initial compounds for a synthesis of $CeO_2$ are preferably cerisopropoxyde, cer-t-buoxide and cer-methoxy ethoxyde. The respective isopropoxydes are preferably suited for synthesis of BaO, CaO and MgO. Zinc tertiary butoxyde and zinc methoxy ethoxyde are particularly suited as precursors for the synthesis of ZnO. For a synthesis of $BaTiO_3$, a mixture of one of the above-mentioned titanium alcoholates and barium isopropoxyde is preferably used.

The nanoparticles produced in accordance with the invention can be further processed with the conventional ceramic shaping methods of film casting, extrusion, electrophoresis, injection molding and pressing known in the art. In primary particle size form, they can be worked into all conventional painting systems and polymers known in the art through suitable surface modification.

To produce e.g. an amorphous nanoscale $TiO_2$ powder, aluminum secondary butylate is added to 1-propanol. To dissolve the Al alcoholate, the mixture is heated, thereby stirring, until a clear solution is produced. After cooling, appropriate amounts of $Ti(O^iPR)_4$, $HCl_{conc}$ and, after 20 minutes of stirring, $H_2O_{deionized}$ are added in drops. The sol is subsequently stirred for 2 hours at room temperature thereby producing a 5 weight % solution of amorphous $TiO_2$, lattice-doped with aluminum, in 1-propanol. The powder can be isolated at 40° C. and 10 mbar with a rotation evaporator.

If a nanoscale aluminum lattice-doped anatase is to be produced, a 5 weight % solution as described above of an amorphous $TiO_2$ powder is added to 1-propanol in a pressure decomposition container of Teflon. The Teflon container is operated for 6 hours at 250° C. After cooling, a white deposit is obtained which consists of n-anatase. The n-anatase is slurried in deionized water and is centrifuged. The deposit is processed in the rotation evaporator (max. 50° C.) until dry powder is obtained.

For synthesis of n-rutile lattice-doped with aluminum and tin, $HCl_{conc}$ is added to $H_2O_{deionized}$. Portions of the above-described amorphous $TiO_2$ powder are subsequently added. The preparation is stirred and homogenized until a clear solution is obtained. $SnCl_4.5H_2O$ is then added, thereby stirring. The solution is put into a pressure decomposition container of Teflon for hydrothermal post-treatment. The Teflon container is operated for 6 hours at 220° C. After cooling, one obtains a yellow-green deposit consisting of lattice-doped n-rutile. The n-rutile can also be prepared without hydrothermal post-crystallization. Stirring at 100° C. for two hours, or better for six hours, is sufficient for crystallization.

A synthesis of n-rutile which is lattice-doped with aluminum and tin is possible through adding $HCl_{conc}$ to $H_2O_{deionized}$. The above-described amorphous $TiO_2$ is then added. The preparation is rapidly stirred for a short time and then disintegrated until a clear solution is obtained. $SnCl_4.5H_2O$ is added, thereby stirring. For hydrothermal post-treatment, the solution is put into a pressure decomposition container of Teflon. The Teflon container is operated for 6 hours at 220° C. After cooling, a yellow-green deposit, consisting of lattice-doped n-rutile is obtained. The n-rutile can also be prepared without hydrothermal post-crystallization. Stirring for two hours, or better for six hours at 100° C. is also sufficient for crystallization.

Synthesis of n-rutile which is lattice-doped with aluminum and tin with an aluminum hydroxide-enriched surface, is obtained by adding $HCl_{conc}$ to $H_2O_{deionized}$. The above-described amorphous $TiO_2$ powder is subsequently added. The preparation is rapidly stirred for a short time and disintegrated until a clear solution is obtained. $SnCl_4.5H_2O$ and $AlCl_3$ (water-free) are added, thereby stirring. The solution is put into a pressure decomposition container of Teflon for hydrothermal post-treatment. The Teflon container is operated for 6 hours at 220° C. After cooling, one obtains a deposit which consists of lattice-doped Al-coated n-rutile. The n-rutile can also be prepared without hydrothermal post-crystallization. Stirring for two hours, or preferably six hours, at 100° C. is sufficient for crystallization. The isoelectrical point of rutile is shifted from pH4.4 to pH6.0 through increase of the aluminum portion. Moreover, the redispersion behavior in water $d_{90}$ (nbr, vol)=20 nm is improved.

For synthesis of n-rutile which is lattice-doped with aluminum and tin, with an inorganic coating of aluminum oxide, the above-described lattice-doped n-rutile can be redispersed in $H_2O_{deionized}$. $AlCl_3$ and $HCl_{conc}$ are added to this solution. The solution must be hydrothermally post-processed for 6 hours at 220° C.

1-propanol is provided in a three-necked flask for synthesis of a nanoscale amorphous $ZrO_2$ powder. $Zr(O^iPr)_4$, $HCl_{conc}$, and after stirring for 20 minutes, $H_2O_{deionized}$ are added in drops thereby obtaining a 5 weight % solution of amorphous $ZrO_2$ in 1-propanol. The powder can be isolated at 40° C. and 10 mbar with the rotation evaporator. For synthesis of nanoscale $ZrO_2$ the 5 weight % solution of the amorphous $ZrO_2$ powder in 1-propanol is put into a pressure decomposition container of Teflon. The Teflon container is operated for 6 hours at 250° C. After cooling, one obtains a white deposit consisting of n-$ZrO_2$. The n-$ZrO_2$ is slurried and centrifuged in deionized water. The deposit is compressed with the rotation evaporator (max. 50° C.) until dry powder is obtained. The n-$ZrO_2$ produced in this manner has a crystallite size of between 3 and 10 nm and a specific surface of more than 200 $m^2/g$.

1-propanol is provided in a three-necked flask for synthesis of a nanoscale amorphous $BaTiO_3$ powder. $Ti(O^iPr)_4$, $Ba(O^iPr)_2$, $HCl_{conc}$, and after stirring for 20 minutes, $H_2O_{deionized}$ are added thereby obtaining a 5 weight % solution of amorphous $BaTiO_3$ in 1-propanol. The powder can be isolated at 40° C. and 10 mbar with the rotation evaporator. For synthesis of nanoscale $BaTiO_3$, the 5 weight % solution of amorphous $BaTiO_3$ powder in 1-propanol is put into a pressure decomposition container of Teflon. The Teflon container is operated for 6 hours at 250° C. After cooling, one obtains a white deposit consisting of n-$BaTiOI_3$. The n-$BaTiO_3$ is slurried and centrifuged in deionized water. The deposit is compressed with the rotation evaporator (max. 50° C.) until a dry powder is obtained. The n-$ZrO_2$ produced in this manner has a crystallite size of between 3 and 10 nm and a specific surface of more than 200 $m^2/g$.

In the material systems described above, ATO ($SnO_2$ doped with Sb) and ITO ($In_2O_3$ doped with Sn) are lattice-doped. The material systems $Y_2O_3$, $CeO_2$, $BaTiO_3$, ZnO, BaO, CaO and MgO have no lattice doping.

Nanoscale rutile or oxide powders can be obtained by initially producing amorphous $TiO_2$, adding a titanium alcoholate and aluminum alcoholate to an alcoholic solution, thereby adding water and acid. The amorphous, aluminum-containing $TiO_2$ is isolated through removal of the solvent and redispersed in water in the presence of a tin salt. Thermal or hydrothermal post-treatment produces a rutile or oxide which can be redispersed to primary particle size. With a primary particle size of between 5 and 20 nm, the n-rutile or oxide obtained can be transparently worked into all organic matrices. The photocatalytic activity is suppressed through lattice-doping with trivalent ions. If the amorphous precursor is redispersed in alcohol or not isolated but directly crystallized, an anatase is obtained which can be redispersed to primary particle size. Variation of the alcoholates also permits preparation of: $ZrO_2$, ZnO, $SnO_2$, ATO, $In_2O_3$, ITO, $Y_2O_3$, BaO, CaO, MgO, $CeO_2$ and $BaTiO_3$.

I claim:

1. A method for producing a nanoscale rutile or oxide, the method comprising the steps of:
   a) adding an alcoholic solution to a first alcoholate containing a rutile or oxide to be extracted, thereby introducing water and acid, to obtain a first suspension having an amorphous material compound, the rutile or oxide selected from the group consisting of titanium dioxide, barium titanate, zirconium dioxide, $SnO_2$, ATO, ITO, $Y_2O_3$, $In_2O_3$, $CeO_2$, ZnO, BaO, CaO and MgO;
   b) isolating said amorphous material compound through removal of solvents;
   c) redispersing, following step b), said amorphous material compound in an aqueous solution which is adjusted to an acidic pH value using acid or in said alcoholic, water, and acid solution of step a) to obtain a second suspension;

d) adding, following step c), at least one of a water soluble tin compound, a water soluble sodium compound, a tin salt, a sodium salt, an ammonium compound or a chemically equivalent compound to said redispersed amorphous material compound; and e) crystallizing the nanoscale rutile or oxide in a hydrothermally or a thermally supported manner.

2. The method of claim 1, further comprising adding a second alcoholate for lattice-doping during step a).

3. The method of claim 2, wherein said first alcoholate is one of titanium alcoholate, zirconium alcoholate, or an alcoholate of another chemical element, said second alcoholate being an aluminum compound, a yttrium compound or a chemical compound which is suitable as a doping material, wherein said tin salt is tin chloride, tin sulfate or a tin oxalate, ammonium chloride ($NH_4Cl$) being used as the ammonium compound, wherein said sodium compound comprises a sodium salt.

4. The method of claim 1, wherein the nanoscale rutile or the nanoscale oxide contains between 2 mol % and 15 mol % of tin.

5. The method of claim 4, wherein the nanoscale rutile or the nanoscale oxide contains more than 3 mol % of tin.

6. The method of claim 4, wherein the nanoscale rutile or the nanoscale oxide contains more than 4 mol % of tin.

7. The method of claim 1, wherein the nanoscale rutile or the nanoscale oxide contains between 0.1 mol % and 0.5 mol % of aluminum.

8. The method of claim 1, wherein the rutile or oxide can be completely redispersed to a particle size of less than 40 nm in a conventional solvent.

9. The method of claim 8, wherein the rutile or oxide can be completely redispersed to a particle size of less than 20 nm.

10. The method of claim 8, wherein said conventional solvent is at least one of water, alcohol, tetrahydrofuran or dichioro methane.

11. The method of claim 1, wherein crystallization of the rutile or oxide is effected in an autoclave at a temperature of between 200 and 300° C.

12. The method of claim 11, wherein said temperature is between 200 and 250° C.

13. The method of claim 1, wherein crystallization of the rutile or oxide is effected purely thermally at a temperature between 50° and 150° C.

14. The method of claim 13, wherein said temperature is approximately 100° C.

15. The method of claim 1, wherein a primary particle size of the rutile can be adjusted through doping with aluminum and/or tin.

16. The method of claim 15, wherein said particle size is between 5 and 40 nm.

17. The method of claim 16, wherein said particle size is preferred between 5 and 20 nm.

18. The method of claim 1, wherein a nanoscale lattice-doped anatase is produced having a crystallite size of between 3 and 25 nm and a surface area per unit mass of between 100 and 250 $m^2$/g.

19. The method of claim 18, wherein said crystallite size is between 5 and 10 nm.

20. A rutile produced by the method of claim 1 and being completely redispersed in $H_2O$ or an organic solution, the rutile having a particle size between 5 nm and 10 nm, wherein the rutile is lattice-doped with at least one of tin, sodium or ammonium atoms.

21. N—$ZrO_2$, n-$BaTiO_3$ or anatase produced by the method of claim 1, wherein the n-$ZrO_2$, the n-$BaTIO_3$, or the anatase is completely redispersed in $H_2O$ or an organic solution, the anatase, the n-$ZrO_2$ or the n-$BaTiO_3$ having a particle size of between 3 nm and 10 nm.

* * * * *